United States Patent
La Croix et al.

[11] Patent Number: 5,898,301
[45] Date of Patent: Apr. 27, 1999

[54] MAGNETIC ENCODER FOR PRODUCING AN INDEX SIGNAL

[75] Inventors: Mark E. La Croix, New Hartford; A. John Santos, Farmington; Stephen J. Lyle, Torrington, all of Conn.

[73] Assignee: The Torrington Company, Torrington, Conn.

[21] Appl. No.: 08/837,231

[22] Filed: Apr. 10, 1997

[51] Int. Cl.$^6$ .............................. G01B 7/14; G01B 7/30; G01D 5/245; G01D 5/12

[52] U.S. Cl. ................................ 324/207.22; 324/207.25; 341/15

[58] Field of Search ............................... 324/174, 207.25, 324/207.22; 123/414, 617, 406.58; 341/15; 310/156, 168

[56] References Cited

U.S. PATENT DOCUMENTS

| | | |
|---|---|---|
| 4,086,533 | 4/1978 | Ricouard et al. . |
| 4,180,753 | 12/1979 | Cook . |
| 4,535,289 | 8/1985 | Abe . |
| 4,745,363 | 5/1988 | Carr et al. . |
| 4,866,381 | 9/1989 | Tatsuhiko ........................... 324/207.25 |
| 5,140,262 | 8/1992 | Stolfus . |
| 5,264,790 | 11/1993 | Moretti et al. . |
| 5,298,827 | 3/1994 | Sugiyama ................................ 310/156 |
| 5,304,926 | 4/1994 | Wu . |
| 5,313,159 | 5/1994 | Allwine . |
| 5,341,097 | 8/1994 | Wu . |
| 5,359,288 | 10/1994 | Riggs et al. . |
| 5,367,257 | 11/1994 | Garshelis . |
| 5,369,361 | 11/1994 | Wada . |
| 5,370,015 | 12/1994 | Moscatelli . |
| 5,528,139 | 6/1996 | Oudet et al. . |
| 5,568,048 | 10/1996 | Schroeder et al. . |
| 5,614,821 | 3/1997 | Leiderer . |

FOREIGN PATENT DOCUMENTS

| | | |
|---|---|---|
| 0 469 318 | 2/1992 | European Pat. Off. . |
| 0 539 602 | 5/1993 | European Pat. Off. . |
| 0 611 952 | 8/1994 | European Pat. Off. . |
| 2 479 453 | 10/1981 | France . |

*Primary Examiner*—Walter E. Snow
*Attorney, Agent, or Firm*—John C. Bigler

[57] ABSTRACT

Magnetic poles are regularly spaced along a path to form a magnetic track. Some of the magnetic poles are separated by regular pole junctions aligned uniformly with respect to the path of the magnetic track. At least two of the magnetic poles are separated by a skewed irregular pole junction aligned such that a sensor near an edge of the magnetic track will sense a wide pole and a narrow pole to allow an index signal to be produced.

4 Claims, 6 Drawing Sheets

MAGNETIC ENCODER FOR PRODUCING AN INDEX SIGNAL

BACKGROUND OF THE INVENTION

This invention relates generally to magnetic encoders and, more particularly, to magnetic encoders for producing an index pulse in addition to a high resolution signal.

Normally in a rotary incremental encoder, when an index pulse is required, the encoder has a unique track for the index pulse function that is separate from the high resolution track. A separate sensor is used to sense the index pulse track. Such encoders may have an optical disk target for use with an optical sensor or a gear tooth wheel or magnet target for use with a magnetic sensor.

For magnetic encoders, the high resolution track and the index pulse track cannot be placed very close to each other because the magnetic field from the index pole would then interfere with the high resolution track. Specifically, the high resolution track on the encoder must be very precise. If a disturbing field (such as from an index pole) is placed near it, the precision will deteriorate in the vicinity of that disturbing field.

Thus, sensors used with magnetic encoders will produce a signal with only poor accuracy if the index track is placed near the high resolution track. As a result, magnetic encoders that have an index pulse must be relatively large to provide the distance needed between the two tracks. Additionally, there are many manufacturing problems with magnetizing an index pulse very near a magnetic high resolution track.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a magnetic encoder comprising a series of magnetic poles regularly spaced along a path to form a magnetic track. Some of the magnetic poles are separated by regular pole junctions aligned uniformly with respect to the path of the magnetic track. At least two of the magnetic poles are separated by an irregular pole junction, skewed with respect to the regular pole junctions such that a magnet sensor near an edge of the magnetic track will sense a wide pole and a narrow pole to allow an index signal to be produced.

In another aspect of the invention, this is accomplished by providing a method for producing an index signal.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

The present invention solves the problems of the prior art by embedding the index pulse into the magnetic track used to provide the high resolution signal. By changing a local area on the magnetic track slightly, magnetic interference is avoided while providing a means to obtain an index pulse. For example, if a section of one pole were made slightly larger or smaller, an index pulse can be produced with only minimal or no interference to the high resolution signal.

This concept is the basis for the following embedded index pole magnetic encoders. In all cases, an analog or digital index pulse is created by taking the difference between an index sensor output and a high resolution sensor output. This index signal has relatively low angular accuracy; however, the signal may then be synchronized with the high resolution signal to produce a very accurate index signal.

Figure 1:
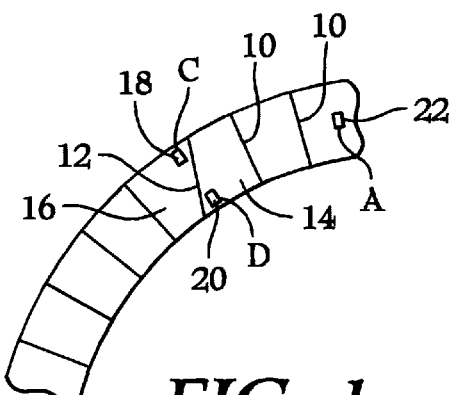
FIGS. 1, 3, 4, 5, 7, 9 and 16 are schematic representations illustrating different embodiments of the magnetic encoder of the present invention.

Referring now to the drawings, FIG. 1 illustrates an embodiment of the invention in which regular pole junctions 10 on an axially magnetized magnet are normally perpendicular to a circular path of a magnetic track, the regular pole junctions being not quite parallel to each other but converging to a point at the center of the circular path. On a radially magnetized magnet having a magnetic track along a linear path, not shown, the regular pole junctions would be normally perpendicular to the linear path and would be parallel to each other.

To embed an index pulse, irregular pole junction 12 between magnetic poles 14 and 16 is skewed with respect to a line perpendicular to the path of the magnetic track. In this embodiment, irregular pole junction 12 is defined by a straight line, angled such that it is not perpendicular to the path and so that it divides magnetic poles 14 and 16 into two trapezoidal areas of similar size. One or two magnetic sensors 18 and 20 are placed toward the edges of the magnetic poles, as shown. If desired, optional magnetic sensor 22 may be provided at the center of the magnetic track for a high resolution track.

Figure 2:
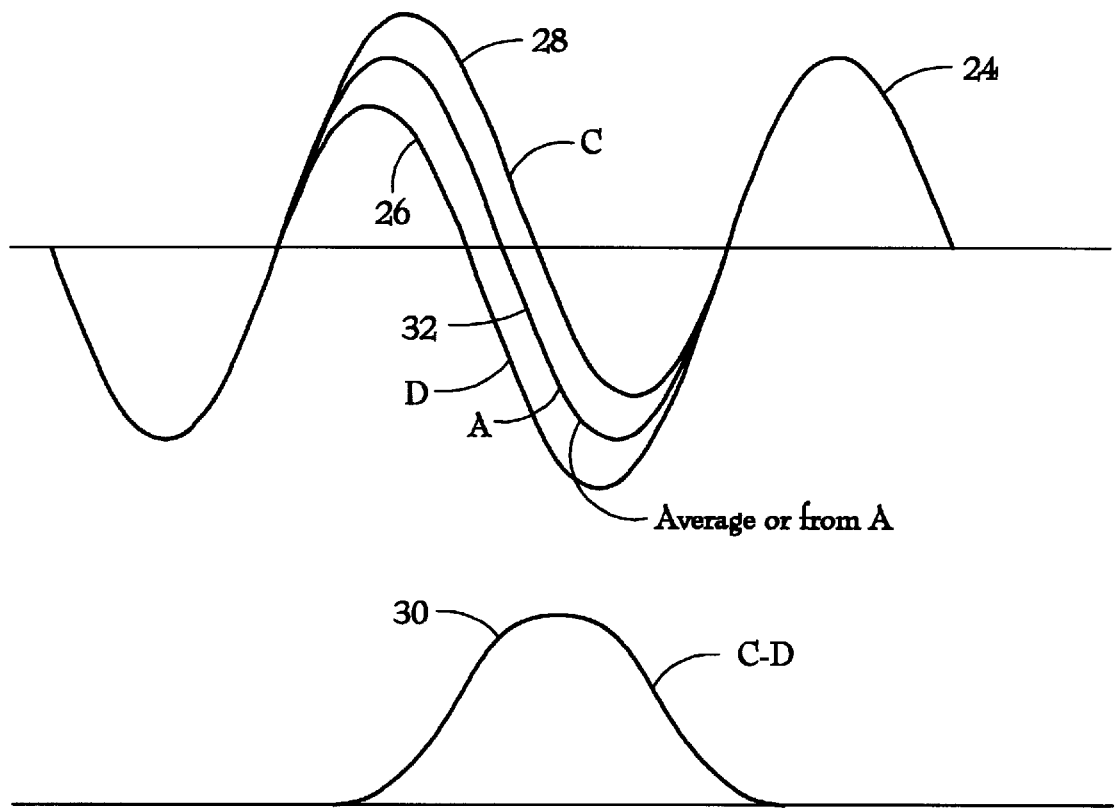
FIGS. 2, 6, 8, 10 and 17 are graphs illustrating signals generated by the illustrated embodiments.

During normal operation, when irregular pole junction 12 is not near magnetic sensors 18, 20 or 22, all the sensor outputs are in phase and look similar, as shown by curve 24 of FIG. 2. When irregular pole junction 12 is near sensors 18 or 20, the sinusoidal magnetic field will either lead or lag the magnetic field sensed by the opposite sensor, as shown by curves 26 and 28. A differential reading of the outputs of sensors 18 and 20 will provide un-synchronized index pulse 30. There is a region in the center of the magnetic poles where the high resolution field is undisturbed, sensed by sensor 22 as curve 32 and corresponding to the average of curves 26 and 28.

Figure 3:
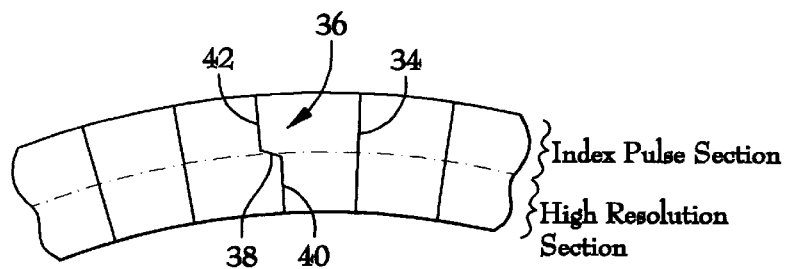

In the preferred embodiment of FIG. 3, distinctly separate portions of the magnetic track are used to produce a high resolution signal and an index pulse. Regular pole junctions 34 are perpendicular to the path of the high resolution track and at least one irregular pole junction 36 is skewed with respect to perpendicular due to a stepped transition 38 between straight pole edges 40 and 42. As a result, that portion of the magnetic track defined by straight pole edge 40 has an ideal pole shape to provide a high resolution signal, and that portion defined by straight pole edge 42 has an ideal pole shape to provide an index pulse signal.

The index pole portion of the magnetic track may be made smaller or larger by placing the index pole edges early or late with a stepped transition. This technique still permits the index portion to be placed near the high resolution portion without disturbing the high resolution portion and allows a larger useable area over the high resolution portion.

Figure 4:
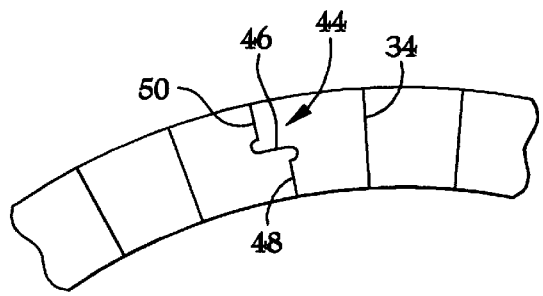

At larger distances from the encoder, the magnetic field of the stepped transition of FIG. 3 will tend to straighten out, becoming more like the magnetic field generated by the embodiment of FIG. 1 and decreasing the useable working range for both high resolution and index portions of the magnetic track. FIG. 4 illustrates a variation of the embodiment of FIG. 3 having irregular pole junction 44 with stepped transition 46 that "overshoots" straight pole edges 48 and 50. The resulting magnetic field of the stepped transition will tend to straighten out closer to an ideal 90 degree angle shape at working magnet to sensor distances.

Figure 5:
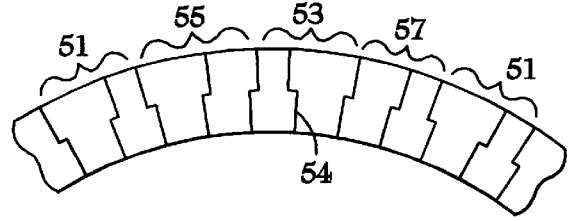
Figure 6:
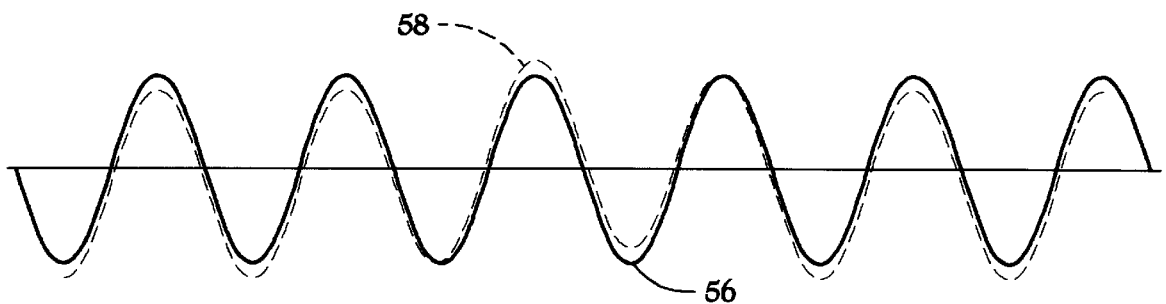

FIG. 5 illustrates a further embodiment of the present invention in which all of the pole pairs 51 on the reference portion of the track, in the non-index portion of the magnet are wide—then narrow when going around the magnet in a clockwise rotation. The pole pair 53 at the index transition 54 is reversed from this. Specifically, it is narrow-then wide when going around the magnet in a clockwise rotation. Pole pairs 55 and 57 are similar to pole pairs 51 except the pole closer to the index pole is a medium width pole (ie. the same width as a high resolution track pole.)

Figure 7:
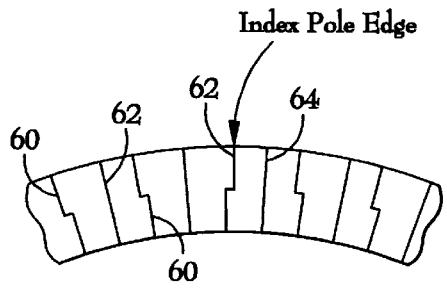
Figure 8:
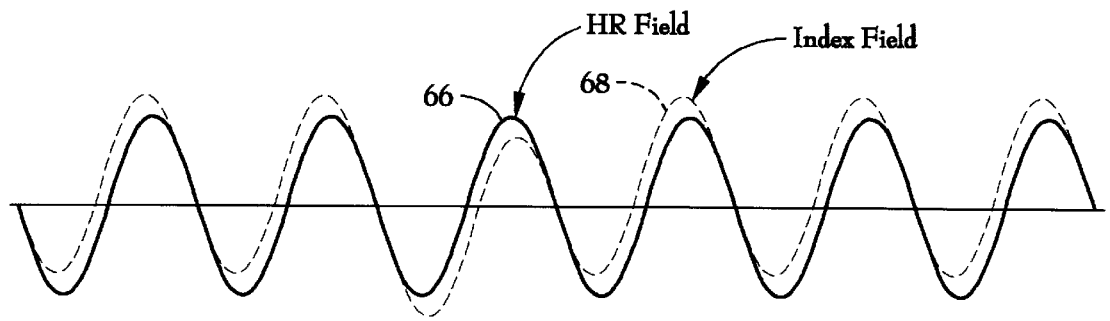

FIG. 7 illustrates an embodiment of the present invention having alternate transitioned pole junctions 60 and non-transitioned pole junctions 62. Index pole junction 64 is shifted in the opposite direction from the rest of the pole junctions. This configuration provides an extra safety margin when processing the signal without disturbing the high resolution portion of the high resolution track. FIG. 8 shows the magnetic field of the high resolution portion as curve 66 and that of the index pulse portion as curve 68.

Figure 9:
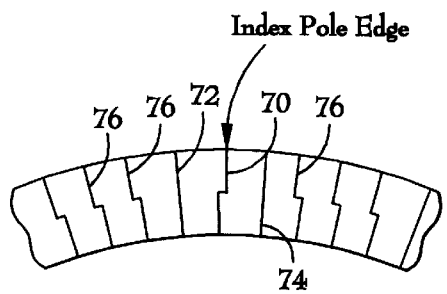
Figure 10:
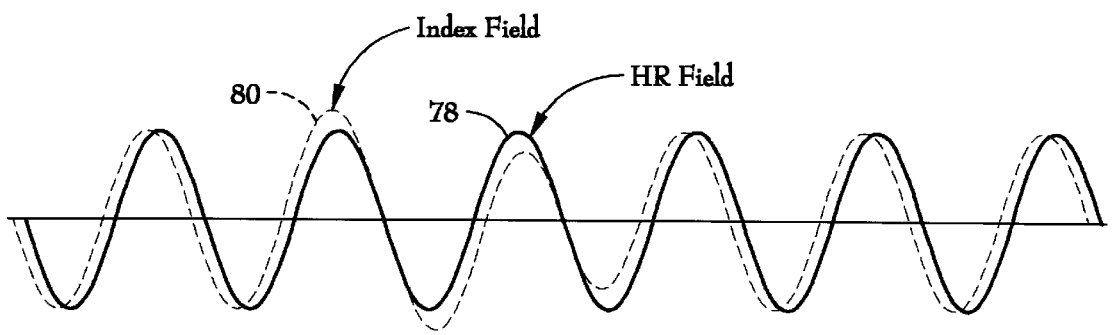

In the embodiment of FIG. 9, a phase shift is introduced between the high resolution portion of the magnetic track and the index pulse portion by shifting the pole junctions in one direction at index pole junction 70, not shifting at all at adjacent pole junctions 72 and 74, and shifting in the opposite direction at all other pole junctions 76. FIG. 10 shows the magnetic field of the high resolution portion as curve 78 and that of the index pulse portion as curve 80.

The multi-pole magnet encoder of the present invention can be magnetized using techniques described generally in various U.S. patents. Basically, a very large but short current pulse is directed through a conductor (such as a wire) so that the resulting magnetic field is channeled through the desired poles. For magnetizing with a pole piece, the pole piece is shaped so the transition over the skewed pole junction is at a required angle. For magnetizing with a conductor placed directly on the desired pole transitions, the conductor is placed on the magnet at a similar angle. For ferrite based plastic magnets (80%–93% strontium or barium ferrite by weight in a plastic matrix) the resulting fields are typically between 100 and 800 gauss at the surface of the magnet.

For the embodiment of FIG. 1, a skew angle of 2 to 45 degrees from perpendicular will be satisfactory. Larger skew angles will provide a physically limited area suitable for high resolution sensing but will produce large index pulse signals. Smaller skew angles will produce a smaller index pulse but will leave a much larger area suitable for high resolution sensing. Also, large skew angles will produce a magnetic field where the altered reference portion of the high resolution track is very near the high resolution un-altered portion, thus allowing a small sensor package. Conversely, small skew angles require larger sensor packages.

To produce the illustrated embodiments, the amount of step should ideally be between 12.5% and 25% of the pole width. Smaller steps will produce a smaller index pulse signal and will cause virtually no interference with the high resolution section. Larger steps will produce a larger index pulse signal and will start to interfere with the high resolution section.

The sensor used with the magnetic encoder of the present invention could be a Hall device or a magneto-resistor sensor, but is not limited to those devices. Ideally the sensor would be very small and have the sensing elements on the same piece of silicon. Depending on the processing technique selected, the sensors should have approximately the same gain and should be placed at approximately the same distance from the magnet face.

Figure 11:
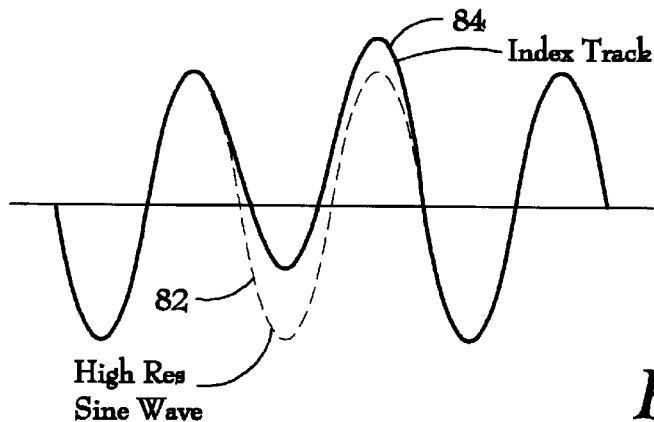
FIGS. 11, 12, 13 and 15 are graphs illustrating signal processing for the illustrated embodiments.

The analog index pulse is obtained by taking the difference between the high resolution sensor and the index pulse sensor. This signal is compared with a predetermined threshold. The threshold could be fixed, or scaled to a fraction of the peak amplitude of the sine wave of the signal. For example, the threshold could be 0.67 of the peak of the sine wave, as illustrated by line 86 in FIG. 11. The signal produced by the high resolution portion of the magnetic track is shown as curve 82, that of the index pulse portion as curve 84, and a 3× multiplication of the differential signal as curve 88.

Figure 12:
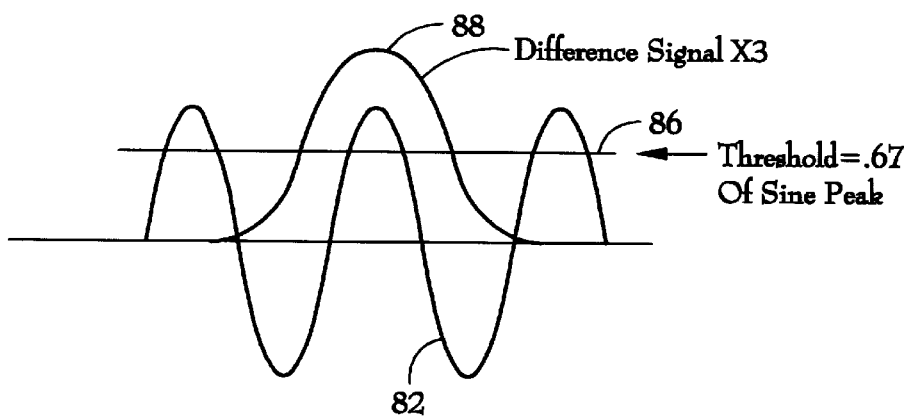
Figure 12:
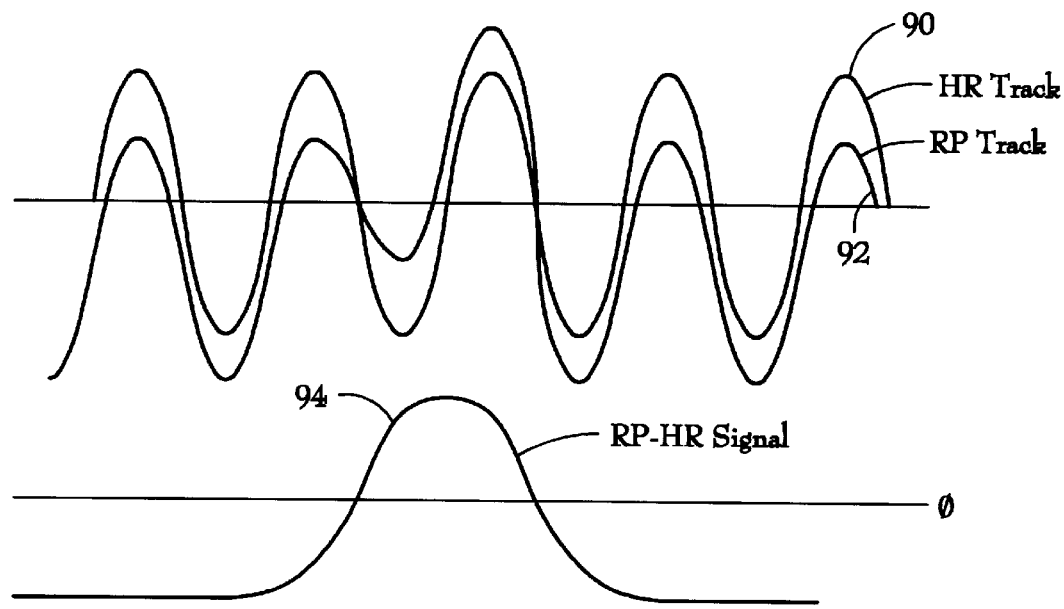

For the embodiment of FIG. 5, the differential signal could be processed two ways:

1) Compare the index sensor with the high resolution sensor to get a difference signal. The threshold will be zero. FIG. 12 illustrates the output of the high resolution sensor as curve 90, the output of the index sensor as curve 92, and the differential signal as curve 94.

Figure 13:
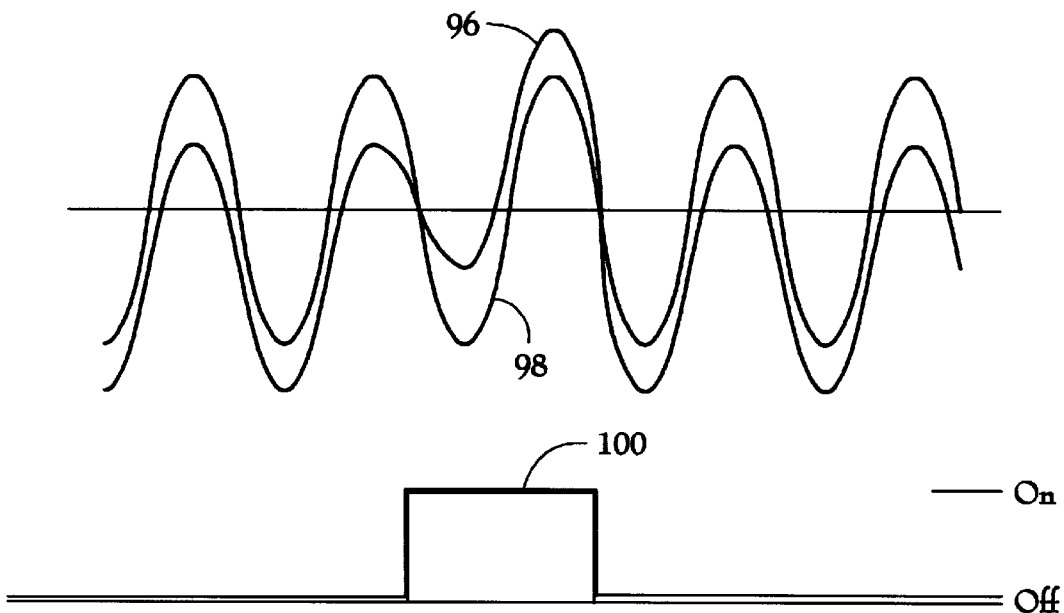
Figure 15:
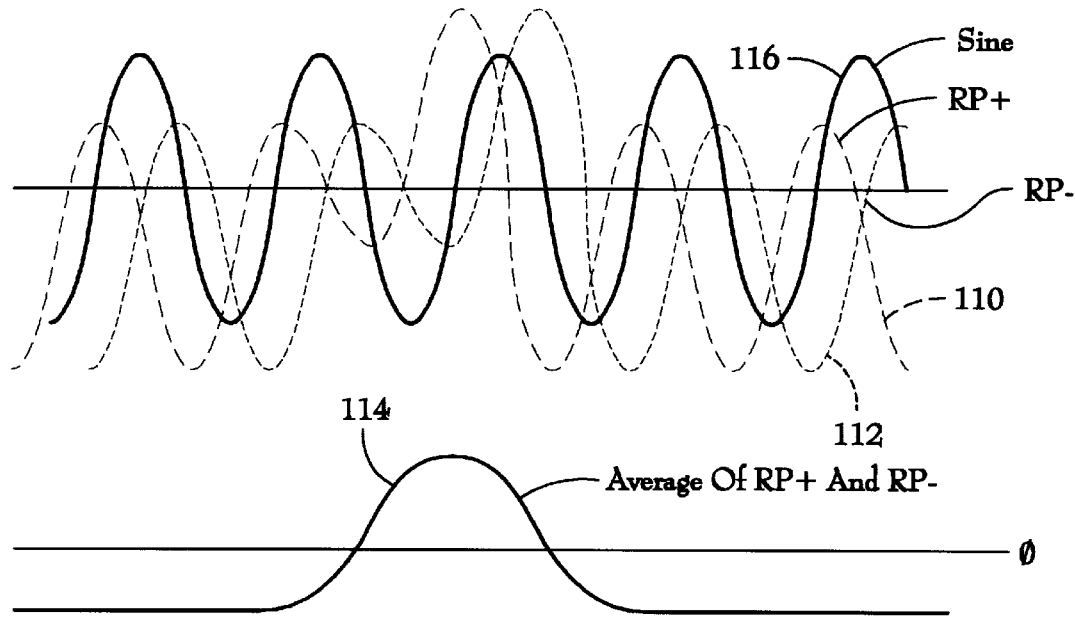

2) Instead of creating a differential signal between the signals of the index and high resolution sensors, just compare the signals digitally. If the index pulse is lower than the high resolution sensor, then the digital index is "off". If the index sensor is higher than the high resolution sensor, then the digital index is "on". This is more simple than the previous technique and is better because it doesn't have an additional offset from the differential amplifier because an amplifier for the differential signal isn't needed. This technique is illustrated in FIG. 13, in which the output of the high resolution sensor is shown as curve 96, the output of the index pulse sensor as curve 98, and the digital output as line 100.

Figure 14:
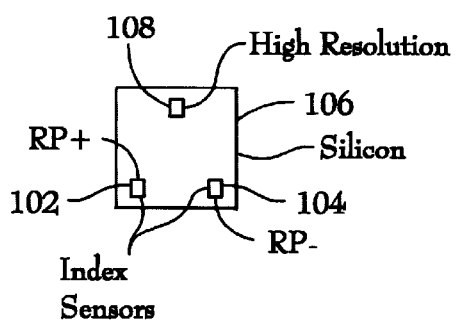
FIG. 14 is a schematic representation illustrating an alternative sensing device for use with the present invention.

An alternative method for sensing the index signal is to use two or more sensors over the index portion of the magnetic track, as illustrated in FIG. 14. Ideally, this technique would be used with the embodiment of FIG. 5 or 7. Preferably, two sensors 102 and 104 would be used, spaced apart a distance of approximately one pole spacing on a single piece of silicon 106 with high resolution sensor 108. When signals 110 and 112 from index sensors 102 and 104 are summed together, a signal is produced that is proportional to the average of the two, indicated as curve 114. This allows for a threshold of zero. There is no dependence on high resolution sensor 108 to get an index pulse or a threshold. Curve 116 indicates the output of high resolution sensor 108.

Figure 16:
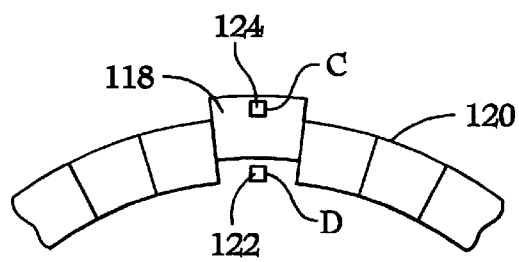
Figure 17:
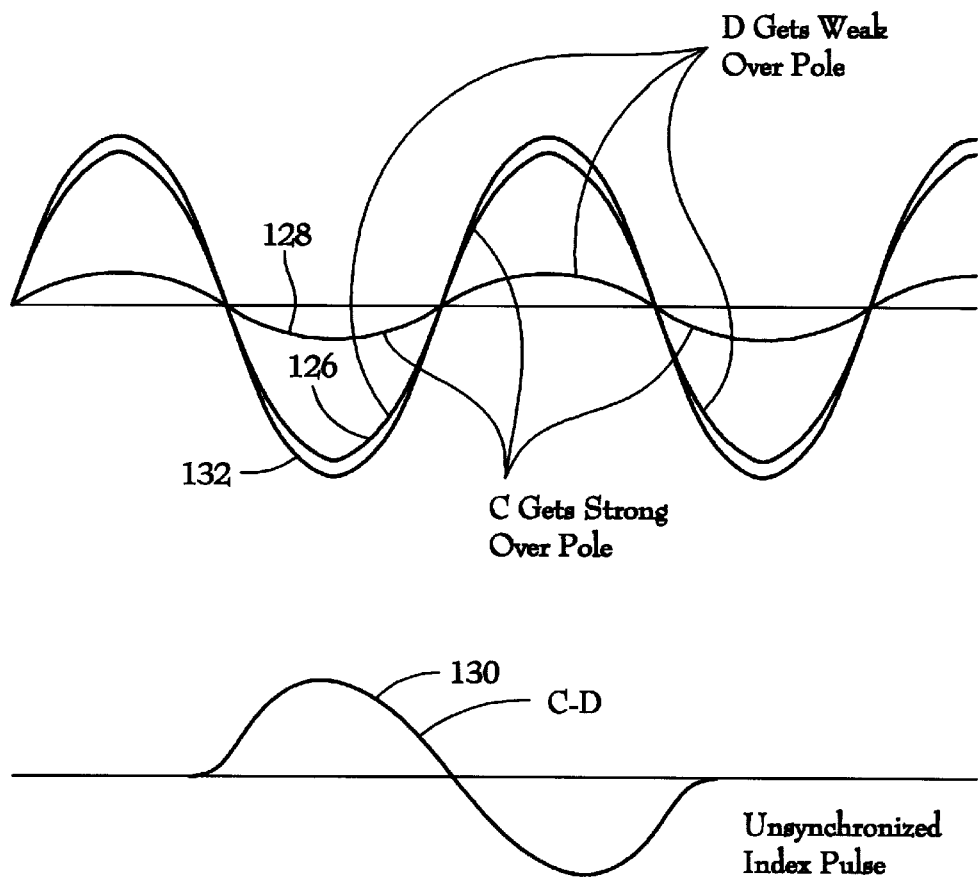

Another method to manufacture a magnet which is similar in many ways to method described above is to offset one pole pair 118 physically toward the ID or OD of a circular magnetic track 120, as illustrated in FIG. 16. Sensor 122 located toward the ID will produce a weaker signal shown as curve 126 at the index pulse. Sensor 124 located toward the OD will produce a stronger signal shown as curve 128. The difference between these two signals provides an un-synchronized index pulse shown as curve 130. The high resolution sensor can be placed directly in the middle of the magnet. A high resolution signal corresponding to curve 132 can be obtained by averaging the outputs of the two index sensors.

Having described the invention, what is claimed is:

1. A magnetic encoder comprising:

a series of magnetic poles regularly spaced along a path to form a magnetic track, some of the magnetic poles being separated by regular pole junctions aligned uniformly with respect to the path of the magnetic track, the magnetic track having an edge; and at least two of the magnetic poles being separated by an irregular pole junction, skewed with respect to the regular pole junctions such that a magnet sensor near the edge of the magnetic track will sense a wide pole and a narrow pole to allow an index signal to be produced.

2. A magnetic encoder according to claim 1, wherein the regular pole junctions are perpendicular to the path of the magnetic track and the irregular pole junction is defined by a straight line angled with respect to a line perpendicular to the path, thereby defining two adjacent magnetic poles of trapezoidal shape and similar size.

3. A magnetic encoder comprising:

a series of magnetic poles regularly spaced along a path to form a magnetic track, some of the magnetic poles being separated by regular pole junctions aligned uniformly with respect to the path of the magnetic track, the magnetic track having an edge; and at least two of the magnetic poles being separated by an irregular pole junction, skewed with respect to the regular pole junctions such that a magnet sensor near the edge of the magnetic track will sense a wide pole and a narrow pole to allow an index signal to be produced, wherein the skewed irregular pole junctions include two parallel segments perpendicular to the path of the magnetic track and a stepped transition therebetween, oriented substantially along the path of the magnetic track to provide an offset between the two parallel segments.

4. A magnetic encoder according to claim 3, wherein the regular pole junctions include two parallel segments perpendicular to the path of the magnetic track and a stepped transition therebetween, oriented substantially along the path of the magnetic track and directed to provide an offset between the two parallel segments that is opposite to that of the irregular pole junctions.

* * * * *